3,217,023
BORON HYDRIDE COMPOUNDS FROM DI-
BORANE AND PHOSPHINES AND ARSINES
Norman E. Miller, Newark, Del., assignor to E. I. du
Pont de Nemours and Company, Wilmington, Del., a
corporation of Delaware
No Drawing. Filed Oct. 30, 1962, Ser. No. 234,257
27 Claims. (Cl. 260—440)

This invention relates to new derivatives of boron-hydrogen compounds and to processes for their preparation. More particularly, it relates to borohydride derivatives containing phosphorus or arsenic.

Boron compounds are valuable industrial products and have been for many years. The early boron compounds were primarily borates; but in recent years compounds containing boron and hydrogen, i.e., borohydrides, and their derivatives have achieved technical importance. There has now been discovered a new and useful class of borohydrides which constitute the subject matter of this invention.

The products of this invention are compounds represented by the formulas (1)  $[BH_2(ZRR'R'')_2]_aA$ and (2)  $M_n[B_{12}H_{10+n-u}X_u(ZRR'R'')_p]_m$ where A is a polyatomic anion of valence $a$ or a monatomic anion of valence $a$ and atomic weight of at least 17;
M is a cation of valence $m$;
Z is phosphorus or arsenic;
X is halogen;
$u$ is a cardinal number between 0 and $10+n$, inclusive;
$n$ is 0 or 1, $p$ is 1 or 2, and $n+p$ is 2; and
R, R', and R'' are the same or different; R is a saturated lower aliphatic hydrocarbon group bonded to Z through a carbon bearing at least one hydrogen; and each of R' and R'' is a saturated lower aliphatic hydrocarbon group bonded to Z through a carbon bearing at least two hydrogens; with the provisos that (a) the number of hydrocarbon groups bonded to the alpha carbon of R, R', or R'' through a carbon bearing no hydrogens is at most one, and (b) R'' is methyl when the sum of the carbons in R and R' is five or greater, i.e., greater than four.

When $u$ is greater than 1, the halogens represented by X can be the same or different.

Compounds of Formula 2 fall into two subgeneric classes, i.e., those of Formula 3 when $n$ is 1 and $p$ is 1, (3)  $M[B_{12}H_{11-u}X_uZRR'R'']_m$ and those of Formula 4 when $n$ is 0 and $p$ is 2, (4)  $B_{12}H_{10-u}X_u(ZRR'R'')_2$ Compounds of Formula 1, depending on the identity of the anion A, give basic or neutral solutions; compounds of Formula 3, depending on the identity of the cation M, give acidic or neutral solutions. In accord with these properties, the formulas of these types of compounds can be written as (5)  $[BH_2(ZRR'R'')_2{}^+]_aA^{a-}$ and (6)  $M^{m+}[B_{12}H_{11-u}X_uZRR'R''^-]_m$ respectively. Compounds of Formula 4 are electrically neutral in that they do not contain discrete cation and anion structural units and do not dissociate and function as electrolytes in aqueous media.

The compounds of Formulas 1 and 3, i.e., products of the invention that do contain discrete cation and anion structural units can be isolated from aqueous solution as hydrates. The invention includes hydrates of the above-described products.

A subclass of products of the invention, preferred because they can be prepared in one step, or in one step followed only by one or more metathetical reactions, as subsequently described, are the compounds of Formulas 1 and 2 in which $u$ is zero. These products can be represented by the formulas (1)  $[BH_2(ZRR'R'')_2]_aA$ and (7)  $M_n[B_{12}H_{10+n}(ZRR'R'')_p]_m$ wherein A, $a$, M, $m$, Z, $n$, $p$, R, R', and R'' are as described above.

Like compounds of Formula 2, compounds of Formula 7 fall into two subgeneric classes, i.e., those of Formula 8, when $n$ is 1 and $p$ is 1, (8)  $M[B_{12}H_{11}ZRR'R'']_m$ and those of formula 9, when $n$ is 0 and $p$ is 2, (9)  $B_{12}H_{10}(ZRR'R'')_2$ A more restricted subclass of products, especially preferred because they can be prepared in one step, and hereinafter referred to, therefore, as primary products, are those of Formulas 1 and 7 in which A is $B_{12}H_{12}$, $a$ is 2, M is $BH_2(ZRR'R'')_2$, and $m$ is 1. These compounds are represented by the formulas

(10)  $[BH_2(ZRR'R'')_2]_2B_{12}H_{12}$ and

(11)  $[BH_2(ZRR'R'')_2]_n[B_{12}H_{10+n}(ZRR'R'')_p]$ where Z, $n$, $p$, R, R', and R'' are as defined above.

Like compounds of Formulas 2 and 7, compounds of Formula 11 fall into two subgeneric classes, i.e., those of Formula 12, when $n$ is 1 and $p$ is 1,

(12)  $[BH_2(ZRR'R'')_2][B_{12}H_{11}ZRR'R'']$ and those of Formula 9, when $n$ is 0 and $p$ is 2.

The brackets in formulas such as Formula 12, i.e., in which there is only one of each bracketed ion, are not essential and are included only for clarity of presentation.

The primary products of the invention, i.e., those of Formulas 10 and 11, or alternatively of Formulas 9, 10, and 12, are prepared by reacting a trialkylphosphine-borane or a trialkylarsine-borane, $BH_3ZRR'R''$, with a boron hydride of the formula $B_yH_{y+4}$ where $y$ is 2, 5, or 10, i.e., diborane ($B_2H_6$), pentaborane (9) ($B_5H_9$), or decaborane (14) ($B_{10}H_{14}$), at a temperature of at least 75° C. From the primary products of Formulas 10 and 12 thus produced, an exceedingly wide range of other products of the Formulas 1 and 7 can be made by metathetical reactions carried out by well-known techniques, including, especially, ion exchange. These processes involve replacement of the anions $B_{12}H_{12}{}^=$ and $$B_{12}H_{11}ZRR'R''^-$$

and the cation $BH_2(ZRR'R'')_2{}^+$ by a variety of other anions and cations. Products of Formulas 2 and 6, or alternatively of Formulas 3 and 4, in which $u$ is 1 or greater are made by reaction of halogenating agents with the nonhalogen-containing compounds of Formulas 8 and 9.

The following examples illustrate the products and process of this invention.

EXAMPLE 1

A 100-cc. shaker tube was evacuated and cooled to

—78° C., charged with 2.7 g. of trimethylphosphine and 1.9 g. of diborane, heated with shaking at 150° C. and autogenous pressure for 10 hours, cooled, and opened. The sticky yellow solid product was extracted with boiling water, and the extract was cooled, whereupon 0.15 g. of $\{BH_2[P(CH_3)_3]_2\}_2B_{12}H_{12}$ precipitated as a colorless, crystalline solid and was separated by filtration.

*Analysis.*—Calcd. for $C_{12}H_{52}B_{14}P_4$: C, 30.5; H, 11.03; B, 32.0; P, 26.2. Found: C, 30.09; H, 10.97; B, 30.85, 31.27; P, 26.06, 24.61.

The infrared spectrum of the product (mineral-oil mull) had absorption at 2480 cm.$^{-1}$ (strong, sharp), 1420 and 1410 cm.$^{-1}$ (weak, sharp), 1300 and 1290 cm.$^{-1}$ (medium, sharp), 1120 cm.$^{-1}$ (weak, sharp), 1060 cm.$^{-1}$ (medium, sharp), 945 cm.$^{-1}$ (medium sharp), 900 and 885 cm.$^{-1}$ (medium, sharp), 845 cm.$^{-1}$ (weak, broad), 760–770 cm.$^{-1}$ (medium, sharp), and 730 cm.$^{-1}$ (medium, broad).

EXAMPLE 2

An aqueous solution of 0.05 g. of $$\{BH_2[P(CH_3)_3]_2\}_2B_{12}H_{12}$$

was put through a column containing a chloride anion-exchange resin ("Amberlite" IRA–400). Evaporation of the effluent liquid gave 0.04 g. of a white, crystalline hydrate of $BH_2[P(CH_3)_3]_2Cl$. The $B^{11}$ n-m-r (nuclear magnetic resonance) spectrum of this compound, run at 10 mc., is a symmetrical quintet of area ratio 0.54.4/5.5/4.4/0.5, $\delta=52$ p.p.m. from methyl borate; separation=90 c.p.s. Similar $A_{B-H}$ and $A_{B-P}$ coupling constants (within peak width) could account for such a spectrum, in which case a 1/4/6/4/1 symmetrical quintet should result, in good agreement with that observed.

If the chloride anion-exchange resin of Example 2 is first converted to the hydroxide form by passing excess aqueous sodium hydroxide through the column, passage of the $\{BH_2[P(CH_3)_3]_2\}_2B_{12}H_{12}$ solution through the column then gives a solution of the corresponding hydroxide, $BH_2[P(CH_3)_3]_2OH$. Neutralization of this solution with any protonic acid, followed by separation of the precipitate, if one appears, or evaporation, gives the salt containing the $BH_2]P(CH_3)_3]_2^+$ cation and the anion of the protonic acid. For example, neutralization with the acids of the left-hand column in the table below gives the salts of the right-hand column.

| Acid | Salt |
| --- | --- |
| Hydrofluoric | $BH_2[P(CH_3)_3]_2F$ |
| Hydrobromic | $BH_2[P(CH_3)_3]_2Br$ |
| Hydroiodic | $BH_2[P(CH_3)_3]_2I$ |
| Nitric | $BH_2[P(CH_3)_3]_2NO_3$ |
| Sulfurous | $\{BH_2[P(CH_3)_3]_2\}_2SO_3$ |
| Phosphoric | $\{BH_2[P(CH_3)_3]_2\}_3PO_4$ |
| Methanedisulfonic | $\{BH_2[P(CH_3)_3]_2\}_2(SO_3)_2CH_2$ |
| Fluoboric | $BH_2[P(CH_3)_3]_2BF_4$ |
| Trichloroacetic | $BH_2[P(CH_3)_3]_2OOCCCl_3$ |
| Picric | $BH_2[P(CH_3)_3]_2OC_6H_2(NO_2)_3$ |
| p-Aminobenzoic | $BH_2[P(CH_3)_3]_2OOCC_6H_4NH_2$ |
| Oxalic | $\{BH_2[P(CH_3)_3]_2\}_2C_2O_4$ |
| Methoxyacetic | $BH_2[P(CH_3)_3]_2OOCCH_2OCH_3$ |
| Carbonic | $BH_2[P(CH_3)_3]_2HCO_3$ |
| Sulfuric | $\{BH_2[P(CH_3)_3]_2\}_2SO_4$ |
| Benzenesulfonic | $BH_2[P(CH_3)_3]_2SO_3C_6H_5$ |

In an alternative procedure for the preparation of other soluble salts containing the cation $BH_2[P(CH_3)_3]_2^+$, the $BH_2[P(CH_3)_3]_2Cl$ of Example 2 can be reacted in solution with a soluble salt whose cation is the one desired in the product and whose anion gives an insoluble chloride. For example, by reaction with a solution of silver acetate, silver lactate, silver nitrate, or silver sulfate, separation of the precipitated silver chloride by filtration or decantation, and evaporation of the resulting solution, the product $BH_2[P(CH_3)_3]_2OOCCH_3$, $$BH_2[P(CH_3)_2]_2OOCHOHCH_3$$

$BH_2[P(CH_3)_3]_2NO_3$, or $\{BH_2[P(CH_3)_3]_2\}_2SO_4$ can be obtained.

EXAMPLE 3

An aqueous solution of $BH_2[P(CH_3)_3]_2Cl$ was combined with an aqueous solution of $NH_4FE_6$. A solid precipitated. It was separated by filtration and recrystallized from water to give $BH_2[P(CH_3)_3]_2PF_6$ as a white crystalline solid.

*Analysis.*—Calcd. for $C_6H_{20}BF_6P_3$: C, 23.25; H, 6.51; P, 30.0. Found: C, 23.58; H, 6.73; P, 28.88.

The infrared absorption spectrum of the product (mineral-oil mull) showed absorption at 2450 and 2400 cm.$^{-1}$ (weak, sharp), 1340 cm.$^{-1}$ (medium, sharp), 1300 cm.$^{-1}$ (medium, sharp), 1120 cm.$^{-1}$ (weak, sharp), 1020 cm.$^{-1}$ (weak, sharp), 990 cm.$^{-1}$ (weak, sharp), 965 and 950 cm.$^{-1}$ (strong, sharp), 885 cm.$^{-1}$ (sharp), 850 cm.$^{-1}$ (very strong, broad), 770 and 735 cm.$^{-1}$ (medium, sharp) (absorption coincident with that of mineral oil not included).

EXAMPLE 4

An aqueous solution of $BH_2[P(CH_3)_3]_2Cl$ was mixed with an aqueous solution of tetrachloroauric acid. The solid that precipitated was separated by filtration and recrystallized from water to give $BH_2[P(CH_3)_3]_2AuCl_4$ as a yellow crystalline solid.

Other sparingly soluble salts containing the $$BH_2[P(CH_3)_3]_2^+$$

cation can be formed by the process of Examples 3 and 4 by substituting soluble salts or acids containing other large anions for the ammonium hexafluorophosphate of Example 3 and the tetrachloroauric acid of Example 4. For example, treatment of a solution of $$BH_2[P(CH_3)_3]_2Cl$$

with solutions of the compounds of the left-hand column of the following table gives the products of the right-hand column.

| Soluble Salt or Acid | Product |
| --- | --- |
| Sodium tetraphenylborate | $BH_2[P(CH_3)_3]_2B(C_6H_5)_4$ |
| Potassium triiodide | $BH_2[P(CH_3)_3]_2I_3$ |
| Ammonium perchlorate | $BH_2[P(CH_3)_3]_2ClO_4$ |
| Ammonium reineckate | $BH_2[P(CH_3)_3]_2Cr(SCN)_4(NH_3)_2$ |
| Potassium dichloroiodide | $BH_2[P(CH_3)_3]_2ICl_2$ |
| Hydrogen tribromide | $BH_2[P(CH_3)_3]_2Br_3$ |
| Ammonium trichloromercurate | $BH_2[P(CH_3)_3]_2HgCl_3$ |
| Picric acid | $BH_2[P(CH_3)_3]_2OC_6H_2(NO_2)_3$ |

EXAMPLE 5

A 400-cc. shaker tube was charged with 6.73 g. of trimethylphosphine and about 4.5 g. of diborane, closed, warmed slowly to 175° C. with shaking, heated at 175° C. and autogenous pressure for 10 hours, cooled, and opened. The yellow solid product remaining in the tube after removal of volatile material was extracted continuously (Soxhlet apparatus) with about 75 ml. boiling water until no more material could be extracted. The water-insoluble solid that remained was recrystallized from a mixture of methylene chloride and ethyl ether to give 1.8 g. of pale-yellow, crystalline $B_{12}H_{10}[P(CH_3)_3]_2$, M.P. 337–350° C. (dec.).

*Analysis.*—Calcd. for $C_6H_{28}B_{12}P_2$: C, 24.65; H, 9.68; P, 21.2; B, 44.4; M.W., 292. Found: C, 24.79, 25.09; H, 10.16, 10.09; P, 21.83; B, 43.23; M.W. 286, 284 (ebull. in methylene chloride).

The infrared absorption spectrum (mineral-oil mull) showed absorption at 2500 cm.$^{-1}$ (strong, sharp), 1420 cm.$^{-1}$ (medium, sharp), 1330 cm.$^{-1}$ (weak, sharp), 1310 cm.$^{-1}$ (medium, sharp), 1090 cm.$^{-1}$ (medium, sharp), 1070 cm.$^{-1}$ (medium, sharp), 1040 cm.$^{-1}$ (weak, sharp), 1010 cm.$^{-1}$ (medium, sharp), 965 cm.$^{-1}$ (strong, sharp), 890 cm.$^{-1}$ (medium, broad), 840 cm.$^{-1}$ (medium, sharp), 770 cm.$^{-1}$ (medium, sharp), 730 cm.$^{-1}$ (medium, sharp), and 690 cm.$^{-1}$ (medium, sharp) (absorption coincident with that of mineral oil not included).

During the extraction process described above, a solid gradually separated from the water in the pot. After extraction was complete, the mixture of solid and water extracts was cooled, and the solid was separated by filtration to give 5.5 g. of $\{BH_2[P(CH_3)_3]_2\}[B_{12}H_{11}P(CH_3)_3]$ as a white, crystalline solid, melting point 240–247° C. The filtrate contained $\{BH_2[P(CH_3)_3]_2\}_2B_{12}H_{12}$ in solution. A sample of the product was recrystallized twice from methanol for analysis.

Calcd. for $C_9H_{40}B_{13}P_3$: C, 28.3; H, 10.55; B, 36.8; P, 24.3. Found: C, 27.42, 28.21, 27.49; H, 10.71, 10.79, 10.76; B, 36.33; P, 23.56.

The infrared absorption spectrum (mineral-oil mull) showed absorption at 2500 cm.$^{-1}$ (strong, sharp), 1420 cm.$^{-1}$ (medium, sharp), 1310 cm.$^{-1}$ (medium, sharp), 1110 cm.$^{-1}$ (weak, sharp), 1080 cm.$^{-1}$ (weak, sharp), 1050 cm.$^{-1}$ (medium, sharp), 1010 cm.$^{-1}$ (weak, sharp), 960 cm.$^{-1}$ (strong, broad), 890 cm.$^{-1}$ (weak, sharp), 865 and 850 cm.$^{-1}$ (very weak, sharp), 770 cm.$^{-1}$ (medium, sharp), 735 cm.$^{-1}$ (medium, broad), 685 cm.$^{-1}$ (weak, broad) (absorption coincident with that of mineral oil not included).

EXAMPLE 6

An aqueous solution of 0.5 g. of $$\{BH_2[P(CH_3)_3]_2\}[B_{12}H_{11}P(CH_3)_3]$$

was put through a column containing an acidic cation-exchange resin ("Amberlite" IR-120). The effluent was an aqueous solution of the strong acid $$H_3O[B_{12}H_{11}P(CH_3)_3]$$

An aliquot sample of the product was titrated with 0.1 N base and found to have a titration curve typical of a strong acid, with an end-point at pH 7. The equivalent weight of the salt observed from the titration was 409±40 (calculated, 382).

The cation remaining on the anion-exchange resin in the column was displaced by adding dilute hydrochloric acid to the column, and the acidic effluent was neutralized and treated with aqueous $NH_4PF_6$ to give solid, crystalline $BH_2[P(CH_3)_3]_2PF_6$, identical with the product of Example 3. This result demonstrates the presence of the cation $\{BH_2[P(CH_3)_3]_2\}^+$ in the second product of Example 5.

EXAMPLE 7

An aqueous solution of $$\{BH_2[P(CH_3)_3]_2\}[B_{12}H_{11}P(CH_3)_3]$$

was passed through a column containing an acidic cation-exchange resin ("Amberlite" IR-120), and the effluent was exactly neutralized with aqueous sodium hydroxide and concentrated by evaporation. The product was the sodium salt $Na[B_{12}H_{11}P(CH_3)_3]$, which was identified by its $B^{11}$ and $P^{31}$ n-m-r spectra. The former, run at 10 mc., showed a symmetrical doublet, δ=36.3 p.p.m. from methyl borate, $A_{B-H}$=125 c.p.s. The $P^{31}$ spectrum as obtained was a single weak peak.

EXAMPLE 8

A portion of the acid solution of $H_3O[B_{12}H_{11}P(CH_3)_3]$ (Example 6) was neutralized with aqueous trimethylsulfonium hydroxide. The solid that precipitated was recrystallized from water to give $$(CH_3)_3S[B_{12}H_{11}P(CH_3)_3]$$

as a colorless, crystalline solid, M.P. 250–252° C.

Analysis.—Calcd. for $C_6H_{29}B_{12}PS$: C, 24.5; H, 9.94; S, 10.88; P, 10.51. Found: C, 21.74, 17.99, 18.01, 22.29, 19.46; H, 10.06, 9.96, 9.84, 10.43, 9.97; S, 11.08, 11.24; P, 10.22, 10.24.

EXAMPLE 9

Another portion of the acid solution of $$H_3O[B_{12}H_{11}P(CH_3)_3]$$

(Example 6) was neutralized with aqueous tetramethylammonium hydroxide, and the solid that precipitated was recrystallized from water to give $$(CH_3)_4N[B_{12}H_{11}P(CH_3)_3]$$

as a colorless, crystalline solid, M.P. 337–338° C. (dec.).

Analysis.—Calcd. for $C_7H_{32}B_{12}NP$: C, 28.9; H, 11.1; N, 4.82; P, 10.64. Found: C, 27.65; H, 11.5; N, 4.75; P, 10.67.

The infrared absorption spectrum (mineral-oil mull) showed absorption at 2520 cm.$^{-1}$ (very strong, sharp), 1465 cm.$^{-1}$ (weak, sharp), 1410 cm.$^{-1}$ (medium, sharp), 1310 cm.$^{-1}$ (weak, sharp), 1290 cm.$^{-1}$ (medium, sharp), 1120 cm.$^{-1}$ (very weak, broad), 1080 cm.$^{-1}$ (medium, sharp), 1050 cm.$^{-1}$ (strong, sharp), 1015 cm.$^{-1}$ (weak, sharp), 960 cm.$^{-1}$ (shoulder at 950, very strong, sharp), 875 cm.$^{-1}$ (medium, sharp), 865 cm.$^{-1}$ (weak, sharp), 800 cm.$^{-1}$ (very weak, broad), 775 cm.$^{-1}$ (medium, sharp), 765 cm.$^{-1}$ (medium, sharp), 740 cm.$^{-1}$ (medium, broad), and 682 cm.$^{-1}$ (medium, sharp) (absorption coincident with that of mineral oil not included).

Other salts containing the $B_{12}H_{11}P(CH_3)_3^-$ anion can be prepared by substituting, for the sodium hydroxide, trimethylsulfonium hydroxide, and tetramethylammonium hydroxide of the foregoing Examples 7, 8, and 9, the hydroxides, oxides, or carbonates of other metals or complexed metals; ammonium hydroxide; hydrazine; or the substituted amines, hydrazines, phosphonium hydroxides, sulfonium hydroxides, or arsonium hydroxides containing the cations described in columns 10–11. For example, neutralization of the acid $$H_3O^+B_{12}H_{11}P(CH_3)_3^-$$

with the bases in the left-hand column of the following table gives the products of the right-hand column.

| Base | Product |
| --- | --- |
| Ammonium hydroxide | $NH_4B_{12}H_{11}P(CH_3)_3$ |
| Silver oxide | $AgB_{12}H_{11}P(CH_3)_3$ |
| Calcium carbonate | $Ca[B_{12}H_{11}P(CH_3)_3]_2$ |
| Hexamminecobalt(III) hydroxide | $Co(NH_3)_6[B_{12}H_{11}P(CH_3)_3]_3$ |
| Hydrazine | $N_2H_5B_{12}H_{11}P(CH_3)_3$ |
| Triethylamine | $(C_2H_5)_3NHB_{12}H_{11}P(CH_3)_3$ |
| Benzyltrimethylammonium hydroxide | $C_6H_5CH_2(CH_3)_3NB_{12}H_{11}P(CH_3)_3$ |
| Ethylenediamine | $NH_3CH_2CH_2NH_3[B_{12}H_{11}P(CH_3)_3]_2$ |
| Dicyclohexylamine | $(C_6H_{11})_2NH_2B_{12}H_{11}P(CH_3)_3$ |
| Diisobutyldiphenylphosphonium hydroxide | $(i-C_4H_9)_2(C_6H_5)_2PB_{12}H_{11}P(CH_3)_3$ |
| Diethyldodecylsulfonium hydroxide | $C_{12}H_{25}(C_2H_5)_2SB_{12}H_{11}P(CH_3)_3$ |
| Octylhydrazine | $C_8H_{17}N_2H_4B_{12}H_{11}P(CH_3)_3$ |
| Cadmium hydroxide | $Cd[B_{12}H_{11}P(CH_3)_3]_2$ |
| Dimethylamine | $(CH_3)_2NH_2B_{12}H_{11}P(CH_3)_3$ |
| Trimethylamine | $(CH_3)_3NHB_{12}H_{11}P(CH_3)_3$ |
| Methyltriphenylarsonium hydroxide | $CH_3(C_6H_5)_3AsB_{12}H_{11}P(CH_3)_3$ |

EXAMPLE 10

Bromine was added dropwise at 0° C. to a solution of $Na[B_{12}H_{11}P(CH_3)_3]$ in methanol until the characteristic color of the bromine persisted. There was thus obtained a solution containing $Na[B_{12}H_7Br_4P(CH_3)_3]$. A portion of this solution was mixed with an aqueous solution of tetramethylammonium chloride, and the solid that precipitated was separated and recrystallized from water to give $(CH_3)_4N[B_{12}H_7Br_4P(CH_3)_3]$ as colorless crystals.

Analysis. — Calcd. for $C_7H_{28}B_{12}Br_4NP$: B, 21.4; N, 2.31; P, 5.11; Br, 52.6. Found: B, 20.79; N, 2.46, 2.33; P, 4.59; Br, 53.76.

The infrared absorption spectrum of the product (mineral-oil mull) had absorption at 2500 cm.$^{-1}$ (strong, sharp), 1450 cm.$^{-1}$ (strong, sharp), 1400 cm.$^{-1}$ (medium, sharp), 1305 cm.$^{-1}$ (weak, sharp), 1290 cm.$^{-1}$ (medium, sharp), 1160 cm.$^{-1}$ (weak, broad), 1090 cm.$^{-1}$ (very weak, broad), 160 cm.$^{-1}$ (weak, broad), 1030 cm.$^{-1}$ (medium, broad), 1000 cm.$^{-1}$ (medium, broad), 980 cm.$^{-1}$ (medium, sharp), 950 cm.$^{-1}$ (strong, sharp), 875 cm.$^{-1}$ (medium, broad), 835 cm.$^{-1}$ (medium, sharp), 820 cm.$^{-1}$ (weak, broad), 795 cm.$^{-1}$ (medium, broad), 770 cm.$^{-1}$ (medium, broad), 740 cm.$^{-1}$ (very weak, broad), 720 cm.$^{-1}$ (very weak, broad), and 688 cm.$^{-1}$ (weak, broad) (absorption coincident with that of mineral oil not included).

EXAMPLE 11

Another portion of the solution of $$Na[B_{12}H_7Br_4P(CH_3)_3]$$

obtained as described in Example 10 was mixed with an aqueous solution of trimethylsulfonium iodide, and the solid that separated was recrystallized from water to give $(CH_3)_3S[B_{12}H_7Br_4P(CH_3)_3]$ as a colorless, crystalline solid.

*Analysis.*—Calcd. for $C_6H_{25}B_{12}Br_4PS$: C, 11.80; H, 4.14; B, 21.3; Br, 52.4; P, 5.10; S, 5.26. Found: C, 11.90; H, 4.40; B, 20.83; Br, 47.9; P, 5.26, 4.77, 4.97; S, 5.44.

Similar salts containing other cations can be precipitated by substituting soluble salts containing the desired cations for the tetramethylammonium chloride of Example 10 and the trimethylsulfonium iodide of Example 11. For example, addition of solutions of the salts of the left-hand column below gives precipitates of the products of the right-hand column:

| | |
|---|---|
| Tetramethylhydrazonium chloride | $(CH_3)_4N_2HB_{12}H_7Br_4P(CH_3)_3$ |
| Tetraisopentylphosphonium bromide | $(i-C_5H_{11})_4PB_{12}H_7Br_4P(CH_3)_3$ |
| o-Phenylenebis(trimethyl-arsonium chloride) | $o-(CH_3)_3AsC_6H_4As(CH_3)_3[B_{12}H_7Br_4P(CH_3)_3]$ |
| Aquopentamminechromium (III) nitrate | $Cr(NH_3)_5H_2O[B_{12}H_7Br_4P(CH_3)_3]_3$ |

EXAMPLE 12

The remainder of the methanol solution of $$Na[B_{12}H_7Br_4P(CH)_3]$$

of Example 10, obtained by bromination at 0° C., was boiled with a solution of excess bromine in methanol about 20 minutes. The resulting solution contained a mixture of $Na[B_{12}H_6Br_5P(CH_3)_3]$ and $$Na[B_{12}H_5Br_6P(CH_3)_3]$$

The solution was cooled and mixed with an aqueous solution of trimethylsulfonium iodide. The solid that precipitated was recrystallized from water to give a 60/40 mixture of $(CH_3)_3S[B_{12}H_6Br_5P(CH_3)_3]$ and $$(CH_3)S[B_{12}H_5Br_6P(CH_3)_3]$$

*Analysis.*—Calcd. for $$(C_6H_{24}B_{12}Br_5P)_3(C_6H_{23}B_{12}Br_6P)_2$$

B, 17.99; Br, 59.7; P, 4.29; S, 4.44. Found: B, 17.99; Br, 59.92; P, 4.25; S, 4.73.

Complete bromination, i.e., formation of the $$B_{12}Br_{11}P(CH_3)_3^-$$

anion, can be realized by evaporating to dryness the methanol solution of the partially brominated sodium salt obtained by the above procedure, dissolving the residual solid in water, and reacting the solution with a mixture of bromine and chlorine at 100–150° C. Addition of trimethylsulfonium iodide then precipitates the product $(CH_3)_3SB_{12}Br_{11}P(CH_3)_3$.

EXAMPLE 13

A 400-cc. shaker tube was charged with 10.4 g. of trimethylarsine and 5 g. of diborane, heated slowly to 175° C. with shaking, maintained at 175° C. and autogenous pressure for 10 hours with shaking, cooled to room temperature, and opened. After removal of volatile material, the product remaining in the tube was 8.1 g. of white, crystalline solid. The product was extracted with 1,2-dimethoxyethane at room temperature, the extract was evaporated, and the residue was recrystallized from aqueous alcohol to give 1.4 g. of $$B_{12}H_{10}[As(CH_3)_3]_2$$

as a colorless, crystalline solid.

*Analysis.*—Calcd. for $C_6H_{28}As_2B_{12}$: C, 18.95; H, 7.44; B, 34.2. Found: C, 19.49, 19.46; H, 7.95, 7.91; B, 35.25, 35.03.

The product was soluble in 1,2-dimethoxyethane, ethyl alcohol, methylene chloride, acetonitrile, and acetone.

The insoluble solid that remained after extraction with 1,2-dimethoxyethane was dissolved in one liter of hot water. Hydrogen was evolved, and an acidic solution resulted. This solution contained, in addition to the products described below, the acids $$H_3O[B_{12}H_{11}As(CH_3)_3]$$

(Example 14) and $(H_3O)_2B_{12}H_2$. Cooling of the mixture followed by filtration of the solid that precipitated gave 1.7 g. of $$\{BH_2[As(CH_3)_3]_2\}[B_{12}H_{11}As(CH_3)_3]$$

as feathery, colorless crystals.

*Analysis.*—Calcd. for $C_9H_{40}As_3B_{13}$: C, 21.1; H, 7.84; As, 43.8; B, 27.4. Found: C, 21.97, 21.75; H, 8.22, 7.96; As, 39.83; B, 27.54.

The product was soluble in acetonitrile and in methylene chloride. It melted at 171–173° C. with only very slight decomposition. The filtrate contained $$\{BH_2[As(CH_3)_3]_2\}_2B_{12}H_{12}$$

in solution.

EXAMPLE 14

As stated previously, the acid mother liquor from the recrystallization of $$\{BH_2[As(CH_3)_3]_2\}[B_{12}H_{11}As(CH_3)_3]$$

(Example 13) contained the acid $H_3O[B_{12}H_{11}As(CH_3)_3]$ in solution. A portion of the solution was neutralized with aqueous trimethylsulfonium hydroxide, whereupon a solid precipitated and was separated by filtration. Recrystallization of the solid from water gave $$(CH_3)_3S[B_{12}H_{11}As(CH_3)_3]$$

as feathery, colorless crystals.

*Analysis.*—Calcd. for $C_6H_{29}AsB_{12}S$: C, 21.25; H, 8.64; B, 38.4; S, 9.48. Found: C, 20.20, 20.67; H, 8.66; B, 37.79; S, 9.70.

EXAMPLE 15

Another portion of the solution of $$H_3O[B_{12}H_{11}As(CH_3)_3]$$

obtained in Example 13 was neutralized with an aqueous solution of tetramethylammonium hydroxide. The solid that precipitated was separated by filtration and recrystallized from water to give colorless crystals of $$(CH_3)_4N[B_{12}H_{11}As(CH_3)_3]$$

*Analysis.*—Calcd. for $C_7H_{32}AsB_{12}N$: C, 25.1; H, 9.63; As, 22.4; B, 38.7; N, 4.19. Found: C, 25.44, 25.71; H, 9.66, 9.86; As, 20.62; B, 38.35; N, 4.12.

As described following Example 9 for salts containing the $B_{12}H_{11}P(CH_3)_3^-$ anion, other salts containing the $B_{12}H_{11}As(CH_3)_3^-$ anion can be prepared by substituting, for the trimethylsulfonium hydroxide of Example 14 or the tetramethylammonium hydroxide of Example 15, the hydroxides, oxides, or carbonates of metals or complexed metals; ammonium hydroxide; hydrazine; or the substituted amines, hydrazines, phosphonium hydroxides, sulfonium hydroxides, or arsonium hydroxides containing the cations described in columns 10–11. For example, the compounds $NaB_{12}H_{11}As(CH_3)_3$, $CsB_{12}H_{11}As(CH_3)_3$, $Cu(NH_3)_4[B_{12}H_{11}As(CH_3)_3]_2$, $Mg[B_{12}H_{11}As(CH_3)_3]_2$, $CH_3NH_3B_{12}H_{11}As(CH_3)_3$, $CH_3(C_6H_5)_3PB_{12}H_{11}As(CH_3)_3$, $C_5H_5NHB_{12}H_{11}As(CH_3)_3$ ($C_5H_5NH$ is pyridinium), and $C_{12}H_{25}(C_2H_5)_3AsB_{12}H_{11}As(CH_3)_3$ can be made in this way. Insoluble products are isolated by filtration as in Example 15; products that remain in solution can be isolated by evaporation.

EXAMPLE 16

A sample of $\{BH_2[As(CH_3)_3]_2\}[B_{12}H_{11}As(CH_3)_3]$ was dissolved in water at 80° C., and the solution was passed at this temperature through a column containing a chloride cation-exchange resin ("Amberlite" IRA-400). By keeping the temperature from exceeding 80° C., decomposition of the cation $BH_2[Ac(CH_3)_3]_2^+$ as described in Example 13 was kept to a minimum. The effluent solution of $BH_2[As(CH_3)_3]_2Cl$ was concentrated to about ⅕ of its original volume, and an aqueous solution of $NH_4PF_6$ was added. A solid precipitated, and was recrystallized from water to give colorless crystals of $BH_2[Ac(CH_3)_3]_2PF_6$.

*Analysis.*—Calcd. for $C_6H_{20}As_2BF_6P$: C, 18.1; H, 5.06; P, 7.80. Found: C, 18.77, 18.73; H, 5.53, 5.25; P, 8.84, 8.14.

The isolation of this product helps confirm the presence of the cation $BH_2[As(CH_3)_3]_2^+$ in the second product of Example 13.

As described following Examples 3 and 4 for sparingly soluble salts containing the $BH_2[P(CH_3)_3]_2^+$ cation, other sparingly soluble salts containing the

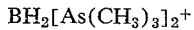

cation can be formed by substituting soluble salts of other large anions for the $NH_4PF_6$ of Example 16. For example, the products

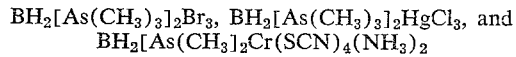

can be made in this way.

By comparison of the infrared spectra of the products of Examples 13–16, absorption spectra could be assigned as follows.

Characteristic of $\{BH_2[As(CH_3)_3]_2\}^+$: 2450 cm.$^{-1}$ (weak, sharp), 2400 cm.$^{-1}$ (weak, sharp), 2200 cm.$^{-1}$ (very weak, sharp), 1420 cm.$^{-1}$ (weak, sharp), 1270 cm.$^{-1}$ (weak, sharp), 1110 cm.$^{-1}$ (weak, sharp), 980 cm.$^{-1}$ (weak, sharp), 930 cm.$^{-1}$ (strong, sharp), 910 cm.$^{-1}$ (strong, sharp).

Characteristic of $[B_{12}H_{11}As(CH_3)_3]^-$: 2500 cm.$^{-1}$ (strong, sharp), 1470 cm.$^{-1}$ (medium, sharp), 1410 cm.$^{-1}$ (medium, sharp), 1280 cm.$^{-1}$ (medium, sharp), 1070 cm.$^{-1}$ (medium, sharp), 1040 cm.$^{-1}$ (strong, sharp), 950 cm.$^{-1}$ (strong, sharp), 920 cm.$^{-1}$ (strong, sharp), 860 cm.$^{-1}$ (medium, sharp), 840 cm.$^{-1}$ (medium, sharp), 715 cm.$^{-1}$ (medium, sharp).

Products of the invention

THE ZRR'R'' MOIETY

In the products of Formulas 1–12, illustrated by the foregoing examples, the trihydrocarbylphosphines and -arsines represented by the term ZRR'R'' have been defined in column 1. From this definition, it will be seen that the groups represented by R, R', and R'' can include alkyl groups of 1–6 carbons and cycloalkyl groups of 3–6 carbons. Examples of trimethylphosphine, trimethylarsine, triethylphosphine, triethylarsine, ethyldimethylphosphine, ethyldimethylarsine, diethylmethylphosphine, butyldimethylphosphine, butyldimethylarsine, dibutylmethylarsine, cyclopentyldimethylphosphine, cyclohexyldimethylarsine, diisohexylmethylphosphine, diisopentylmethylarsine, dimethylneopentylphosphine, hexylmethylpropylphosphine, and methyldipropylarsine. Because of ease of preparation, preferred ZRR'R'' compounds are those in which the groups R, R', and R'' are the same, i.e., trimethylphosphine, triethylphosphine, trimethylarsine, and triethylarsine.

THE ANION A

In the products of Formulas 1 and 5, illustrated in the foregoing Examples 1–5, 13, and 16, A can be any polyatomic anion or any monatomic anion of atomic weight of at least 17. Anions of atomic weight or radical weight of from 17 up to at most 216 are preferred. A can be an inorganic anion, e.g., fluoride, chloride, bromide, iodide, hypochlorite, chlorite, bromate, periodate, perchlorate, nitrite, nitrate, sulfite, sulfate, selenate, thiosulfate, persulfate, permanganate, phosphate, metaphosphate, pyrophosphate, hypophosphite, cyanide, carbonate, bicarbonate, borate, fluoborate, hydroxide, arsenate, azide, hydroborate ($BH_4^-$), bromoplatinate, chloroferrate, chromate, bichromate, cyanate, thiocyanate, ferricyanide, cyanomolybdate, fluosilicate, vanadate, cyanocobaltate, cyanonickelate, tetracarbonylcobaltate, or dodecahydrododecaborate ($B_{12}H_{12}^=$).

For reasons of availability, a preferred group of inorganic anions are the commercially available fluoride, chloride, bromide, iodide, nitrate, sulfate, phosphate, cyanide, carbonate, cyanate, and thiocyanate.

A can also be an organic or organo-inorganic anion, e.g., formate, acetate, isobutyrate, dodecanoate, 2-ethylhexanoate, benzoate, 2-naphthoate, 1-naphthaleneacetate, trifluoroacetate, chloroacetate, trichloroacetate, adipate, p-nitrobenzoate, phenylacetate, m-bromobenzoate, p-toluenesulfonate, benzenesulfinate, methanesulfonate, hydroxyacetate, dimethyldithiocarbamate, β-methoxyproprionate, octadecanoate, 1-phenanthrenecarboxylate, picrate, ethanephosphonate, hydroxynaphthalenesulfonate, or the anion $B_{12}H_{11-u}X_uZRR'R''^-$ of Formula 3. For reasons of availability, preferred organic and organo-inorganic anions are those containing 1–12 carbons.

Because compounds containing them are prepared directly in one step of the process of page 4, especially preferred anions are $B_{12}H_{12}^=$ and the anion $B_{12}H_{11}ZRR'R''^-$ of Formula 8.

THE CATION M

In the products of Formulas 2, 6, and 7, illustrated in the foregoing Examples 5–15, M can be any cation. It can be an inorganic cation, e.g., hydrogen (usually present in the hydrated form, i.e., hydronium, $H_3O^+$), ammonium, hydrazonium, or a cation derived from any metal in the Periodic Table shown in Deming's "General Chemistry", fifth edition, page 156 (Wiley, 1944), i.e., a metal of Groups IA–VIA inclusive, IB–VIIB inclusive, VIII. Examples are lithium, potassium, rubidium, cesium, beryllium, magnesium, strontium, copper, mercury, barium, aluminum, tin, bismuth, silver, zinc, vanadium, chromium, manganese, ruthenium, cobalt, and nickel. In addition, M can be a complex cation of any such metal, e.g., tetramminecopper (II), tetramminezinc (II), diaquotetramminechromium (III), tris(1,2-propanediamine)chromium (III), nitratopentamminecobalt (II), dichlorobisethylenediaminecobalt (III), dicyclopentadienyliron (III), dibenzenechromium (I), and tris-(acetylacetonato)silicon.

Because of availability and ease of preparation, hydronium, ammonium, hydrazonium, and cations of metals of Groups IA, IIA, IB, and IIB of atomic number less than 57 constitue a preferred class of inorganic cations, hydronium, ammonium, and alkali-metal cations being especially preferred.

In addition, M can be an organic or organo-inorganic cation, e.g., the cation $BH_2(ZRR'R'')_2^+$ of Formulas 1 and 5, or any of an extremely broad class of substituted ammonium, hydrazonium, phosphonium, sulfonium, and arsonium compounds represented by the formulas $QNH_3^+$, $Q_2NH_2^+$, $Q_3NH^+$, $Q_4N^+$, $QN_2H_4^+$, $Q_2N_2H_3^+$, $Q_3N_2H_2^+$, $Q_4N_2H^+$, $Q_4P^+$, $Q_3S^+$, and $Q_4As^+$, where the Q groups are the same or different and are organic groups bonded to the nitrogen, phosphorus, sulfur, or arsenic shown in the foregoing formulas through carbon, any multiple bond connected to which carbon is part of a ring. Any two of the Q groups can be joined together to form a divalent organic radical. Although the nature of the organic substituents on nitrogen, phosphorus, sulfur, and arsenic in these cations is immaterial to the in-invention, preferred substituents, for reasons of availability, are monovalent hydrocarbyl groups of 1–12 carbons in which any unsaturation is aromatic, and divalent hydrocarbyl and oxygen-interrupted hydrocarbyl groups of at most 12 carbons in which any unsaturation is aromatic, said divalent groups being formed as described above by joining together any two of the Q groups. Examples are methylammonium, cyclopropylammonium, 1-methylheptylammonium, 2-(1-naphthyl)ethylammonium, diisobutylammonium, dicyclohexylammonium, dinonylammonium, morpholinium, dodecamethyleniminium, triisopropylammonium, N-methylpiperidium, pyridinium, 4-methylquinolinium, trihexylammonium, benzyltrimethylammonium, tetraisopentylammonium, dodecyltrimethylammonium, phenylhydrazonium, 1-methyl-1-phenylhydrazonium, 1-methyl-2-isopropyl-hydrazonium, dodecylhydrazonium, 1,1,2-triethylhydrazonium, 1,1,1-triheptylhydrazonium, tetramethylhydrazonium, tetrabenzylhydrazonium, tetramethylphosphonium, tetrabenzylphosphonium, tetra(1-naphthyl)phosphonium, ethyltri(decyl)phosphonium, benzyldodecyldimethylphosphonium, dihexylmethylphenylphosphonium, 2,4,6-trimethylphenyltrimethylphosphonium, isobutylethylmethylisopropylphosphonium, ethylpentamethylene-p-tolylphosphonium, triphenylsulfonium, methyltetramethylenesulfonium, benzyldodecylmethylsulfonium, methyldipentylsulfonium, tetraethylarsonium, methyltriphenylarsonium, and benzyldimethyloctylarsonium. M can also be a polybasic substituted ammonium, phosphonium, sulfonium, or arsonium cation of the type described above, i.e., one in which two or more nitrogen, phosphorus, sulfur, or arsenic atoms are joined by one or more divalent organic groups. Again for reasons of availability, preferred cations of this type are those in which any organic group is hydrocarbyl of at most 12 carbons and in which any unsaturation is aromatic. Examples are ethylenebis(ethylammonium), hexamethylenediammonium, N,N'-dimethylpiperazinium, 1,2-phenylenebis(methylenetriethylphosphonium), ethylenebis(dodecylmethylsulfonium), m-phenylenediammonium, and ethylenebis(diethylphenylarsonium). Cations of the above types containing only lower alkyl groups, especially those in which all alkyl groups are the same, are especially preferred.

Because compounds containing them are prepared directly in one step by the process of column 2 an especially preferred class of organo-inorganic cations are those of the formula $BH_2(ZRR'R'')_2^+$ (Formula 1).

THE HALOGEN X

In the products of Formulas 3 and 4, X can be any halogen, i.e., fluorine, chlorine, bromine, or iodine. Products in which all the halogens are the same are preferred, since fewer steps are required for their preparation. Chlorine and bromine are the preferred halogens because of ease of preparation of products containing them.

*Preparation of primary products*

As previously stated, and as illustrated in the foregoing Examples 1, 5, and 13, products of Formulas 9, 10, and 12 are made by reacting a trialkyl-phosphine-borane or a trialkylarsine-borane, $BH_3ZRR'R''$, with diborane ($B_2H_6$), pentaborane (9) ($B_5H_9$), or decaborane (14) ($B_{10}H_{14}$) at a temperature of at least 75° C. The adducts $BH_3ZRR'R''$ are formed readily by allowing a compound of the formula $ZRR'R''$, defined above, to react with diborane at ordinary temperatures (20–30° C.) or below, the reaction being

(13) 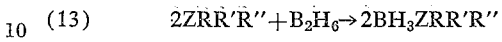

A convenient way of carrying out the process of the invention, therefore, is to mix the phosphine or arsine with an excess of diborane at ordinary or lower temperatures and then raise the temperature to above 75° C., whereupon the adduct, formed immediately when the reactants are mixed, reacts with more diborane to give the products of the invention. The foregoing method constitutes a preferred embodiment of the process of the invention.

When pentaborane (9) or decaborane (14) instead of diborane is reacted with the adduct $BH_3ZRR'R''$, the process is conveniently carried out as follows: The adduct is formed in the reactor to be used for the process of the invention by allowing diborane to react at ordinary temperature or below with the amount of the compound $ZRR'R''$ prescribed by Equation 13. It need not be isolated. Pentaborane (9) or decaborane (14) is then added, and the mixture is raised to the desired temperature to form the products of the invention.

The process can be conducted at any temperature between 75° C. and the decomposition temperature of the products. The preferred range for a batch process is 140–220° C. Higher temperatures can be used in a continuous process, e.g. temperatures as high as about 300° C.

Pressure is not critical; the process can be conducted at superatmospheric, atmospheric, or subatmospheric pressure. It is most conveniently carried out at the autogenous pressure of the reactants in a closed system.

The molar ratio of the adduct $BH_3ZRR'R''$ to boron hydride can vary over a considerable range. $BH_3ZRR'R''$/boron hydride ratios of 0.1 to 10 can be used. Usually the higher the boron content of the boron hydride, the higher the ratio that is conveniently used. Preferred values for this molar ratio are from 0.2 to 5. In the preferred embodiment of the process, in which the compound $ZRR'R''$ and diborane are used as initial reactants, the $ZRR'R''/B_2H_6$ molar ratio is usually between 0.25 and 0.7; the $BH_3ZRR'R''/B_2H_6$ molar ratio is therefore usually between 0.29 and 1.1.

A solvent is not required, but a mutual, inert solvent for the reactants can be used if desired.

The process can be complete in as little as one hour or can require as long as 24 hours. Under the preferred conditions of temperature, it usually is complete within 8–12 hours.

Following removal of any volatile material, the products can be isolated from each other by selective extraction and crystallization processes, advantage being taken at this stage of the different types and degrees of solubility of the products.

The process described above and illustrated specifically in Examples 1, 5, and 13 can be used to prepare other primary products of the invention, represented by Formulas 9, 10, and 12. For example, in Table I, the adducts represented by the formulas in column 1 can be reacted with the boron hydrides of column 2 by the process of the invention to give in each case the products represented by the formulas in column 3.

The products listed in column 3 of Table I can be transformed into other products of the invention by means of the metathetical and substitution reactions discussed in detail below and illustrated both in the foregoing examples and in the discussions and illustrations following Examples 2, 4, 9, 11, 12, 15, and 16.

TABLE I

| Column 1<br>Borane Adduct | Column 2<br>Boron Hydride | Column 3<br>Products |
|---|---|---|
| $BH_3P(C_2H_5)_3$ | $B_{10}H_{14}$ | $\{BH_2[P(C_2H_5)_3]_2\}_2B_{12}H_{12}$<br>$BH_2[P(C_2H_5)_3]_2B_{12}H_{11}P(C_2H_5)_3$<br>$B_{12}H_{10}[P(C_2H_5)_3]_2$ |
| $BH_3As(C_2H_5)_3$ | $B_5H_9$ | $\{BH_2[As(C_2H_5)_3]_2\}_2B_{12}H_{12}$<br>$BH_2[As(C_2H_5)_3]_2B_{12}H_{11}As(C_2H_5)_3$<br>$B_{12}H_{10}[As(C_2H_5)_3]_2$ |
| $BH_3P(CH_3)_2C_5H_{11}$ | $B_2H_6$ | $\{BH_2[P(CH_3)_2C_5H_{11}]_2\}_2B_{12}H_{12}$<br>$BH_2[P(CH_3)_2C_5H_{11}]_2B_{12}H_{11}P(CH_3)_2C_5H_{11}$<br>$B_{12}H_{10}[P(CH_3)_2C_5H_{11}]_2$ |
| $BH_3As(CH_3)_2i\text{-}C_4H_9$ | $B_5H_9$ | $\{BH_2[As(CH_3)_2i\text{-}C_4H_9]_2\}_2B_{12}H_{12}$<br>$BH_2[As(CH_3)_2i\text{-}C_4H_9]_2B_{12}H_{11}As(CH_3)_2i\text{-}C_4H_9$<br>$B_{12}H_{10}[As(CH_3)_2i\text{-}C_4H_9]_2$ |
| $BH_3PCH_3(C_6H_{13})_2$ | $B_{10}H_{14}$ | $\{BH_2[PCH_3(C_6H_{13})_2]_2\}_2B_{12}H_{12}$<br>$BH_2[PCH_3(C_6H_{13})_2]_2B_{12}H_{11}PCH_3(C_6H_{13})_2$<br>$B_{12}H_{10}[PCH_3(C_6H_{13})_2]_2$ |
| $BH_3P(CH_3)_2C_6H_{11}$<br>$(C_6H_{11}=\text{cyclohexyl})$. | $B_2H_6$ | $\{BH_2[P(CH_3)_2C_6H_{11}]_2\}_2B_{12}H_{12}$<br>$BH_2[P(CH_3)_2C_6H_{11}]_2B_{12}H_{11}P(CH_3)_2C_6H_{11}$<br>$B_{12}H_{10}[P(CH_3)_2C_6H_{11}]_2$ |
| $BH_3P(CH_3)_2CH(CH_3)_2$ | $B_5H_9$ | $\{BH_2[P(CH_3)_2CH(CH_3)_2]_2\}_2B_{12}H_{12}$<br>$BH_2[P(CH_3)_2CH(CH_3)_2]_2B_{12}H_{11}P(CH_3)_2CH(CH_3)_2$<br>$B_{12}H_{10}[P(CH_3)_2CH(CH_3)_2]_2$ |

*Preparation of products containing other anions or cations*

As previously stated, the products of Formulas 1 and 7 in which A is other than $B_{12}H_{12}$ or $B_{12}H_{11}ZRR'R''$ and M is other than $BH_2(ZRR'R'')_2$ are prepared by metathetical reactions in which well-known techniques are used. Water, lower alcohols, and mixtures thereof are usually used as solvents, although other polar solvents can be used. The preparations can be carried out by one or more of a variety of general methods, of which the following, (a), (b), (c), and (d), are typical:

(a) When the desired product is relatively insoluble, it is most easily prepared by mixing solutions of compounds containing the ions of the desired product. This method is illustrated in the foregoing Examples 3, 4, and 16.

(b) When the desired product is of the same order of solubility as the reactants, it can sometimes be prepared by passing a solution of a compound containing one of the ions of the desired product through a column packed with an ion-exchange resin containing the other ion of the desired product. This process is especially useful for preparing hydronium compounds containing the $$B_{12}H_{11}ZRR'R''^-$$

anion and hydroxides containing the $BH_2(ZRR'R'')_2^+$ cation. It is illustrated by the foregoing Examples 2, 6, 7, and 16. When Z is As, acids of the type $$H_3O^+B_{12}H_{11}AsRR'R''^-$$

can also be prepared by heating salts of the formula $$[BH_2(AsRR'R'')_2]^+[B_{12}H_{11}AsRR'R'']^-$$

with water above about 80° C., which treatment brings about hydrolysis of the cation. This method is illustrated in the foregoing Example 13.

(c) A compound containing the anion or cation desired in the product can be converted to the corresponding hydronium compound or hydroxide by method (b) above, and this intermediate can be neutralized with a base or acid containing the other ion desired in the product. This procedure, which can be used for either soluble or insoluble products, is illustrated by the foregoing Examples 7–9, 14, and 15.

(d) When the desired product is soluble, it can frequently be prepared by a metathetical reaction of which the by-product is relatively insoluble. This method is illustrated in the discussion following Example 2.

*Preparation of halogenated products*

As previously stated, and as illustrated by Examples 10 and 12, products of Formulas 3 and 4 in which $u$ is 1 or greater are made by reacting halogenating agents with the corresponding nonhalogenated compounds of Formulas 8 and 9. The preferred halogenating agents are the free halogens themselves, i.e., fluorine, chlorine, bromine, and iodine. Interhalogen compounds, such as BrCl and ICl, can also be used.

Halogenation of the saltlike compounds of Formula 8 is carried out in solution in water or polar organic solvents such as alcohols and glycol ethers, or mixtures thereof. Lower alkanols are preferred organic solvents. For fluorinations, water is the preferred solvent. If desired, especially in nonaqueous systems, a hydrogen-halide acceptor such as sodium carbonate or calcium carbonate can be incorporated in the reaction mixture. Because of availability and ease of handling, alkali metals are preferred M components in the compounds of Formula 8 to be halogenated. Sodium is especially preferred for economic reasons.

Ordinarily an amount of halogen between the stoichiometric amount for the desired reaction and a 100% excess is used. Within the possible degrees of halogenation (values of $u$ in Formula 3), available with a given amount of halogen, the degree of halogenation is determined largely by the temperature. The higher the temperature, the higher the degree of substitution. Temperatures from about —10° C. to 150° C. can be used. For a given degree of substitution, the required temperature is higher, the higher the atomic weight of the halogen; i.e., it is lowest for fluorine and highest for iodine. Complete halogenation with the less reactive halogens, i.e., bromine and iodine, can be facilitated by halogenating to an intermediate degree with the desired halogen alone and then finishing off the desired reaction at a higher temperature in the presence of the desired halogen and chlorine.

The time required for halogenation is usually between about 15 minutes and two hours. The halogenated products can be isolated by evaporation of volatile materials or by precipitation with other cations.

Halogenated products containing more than one kind of halogen can be made by halogenating to the desired degree of substitution with one halogen, isolating the product, and halogenating it with a different halogen, or sequentially with different halogens, until the desired polyhalogenated product is obtained.

Halogenation of the electrically neutral compounds of Formula 9 is best carried out in inert, halogenated, organic solvents such as methylene chloride, ethylene chloride, ethylene bromide, chloroform, or carbon tetrachloride. Otherwise, the general principles stated above for halogenation of the saltlike compounds of Formula 8 apply, except that in general, compounds of Formula 9 react more slowly with halogens, and higher temperatures are therefore required to reach a given degree of substitution.

In the halogenation of either type of product described above, temperatures above the boiling points of the reaction mixtures can be readily attained, if desired, by operating in closed systems under autogenous pressure.

As is the case with the corresponding non-halogenated salts, and as illustrated in the discussions following Examples 11 and 12, the cation M in any halogenated salt of the formula (3) $M[B_{12}H_{11-u}X_uZRR'R'']_m$ can be replaced by other cations by known methods discussed previously.

The following are examples of halogenated products that can be prepared by the processes described above, illustrated by Examples 10, 11, and 12:

$H_3OB_{12}H_{10}ClAs(CH_3)_3$, $NH_4B_{12}H_3F_8P(C_2H_5)_3$
$N_2H_5B_{12}H_8Br_3P(C_6H_{11})_2CH_3$ ($C_6H_{11}$=cylcohexyl)
$KB_{12}H_9I_2As(C_2H_5)_2CH_3$
$Sr[B_{12}H_5Cl_6P(C_3H_7)(CH_3)_2]_2$, $Zn[B_{12}H_2Cl_9As(C_2H_5)_3]_2$
$(CH_3)_4AsB_{12}I_{11}P(CH_3)_3$, $(C_5H_5)_2CoB_{12}Cl_{11}As(CH_3)_3$
($C_5H_5$=cyclopentadienyl)

$[O\!\!\begin{array}{c}CH_2-CH_2\\ \\ CH_2-CH_2\end{array}\!\!NHCH_3]B_{12}H_7I_4P(C_6H_{13})(C_2H_5)CH_3$ $Cu[B_{12}Br_{11}P(C_2H_5)_3]_2$
$CH_3(C_6H_5)_3PB_{12}HCl_{10}As(C_3H_7)_2CH_3$
$B_{12}F_{10}[As(CH_3)_3]_2$, $B_{12}H_5Br_5[P(CH_3)_3]_2$
$B_{12}H_9I[P(C_2H_5)_3]_2$, $H_3OB_{12}Cl_5Br_6P(CH_3)_3$
$Ca[B_{12}H_5F_3I_3P(C_2H_5)_3]_2$, and
$B_{12}H_8ClBr[As(C_2H_5)_2CH_3]_2$

*Properties of the products*

The products of this invention are for the most part crystalline solids and are stable to air and water at ordinary temperatures. The products of Formulas 1 and 3, depending on the nature of the cation and anion present, are acidic, basic, or saltlike; consequently, they are soluble to varying degrees in water and some polar organic solvents such as alcohols. The products of Formula 4, being electrically neutral, are usually insoluble in water and soluble in organic solvents. All the crystalline products can be recrystallized from suitable solvents.

*Utility*

The many new products provided by this invention have applications in a variety of fields.

The products of the invention are useful as components of fireworks compositions, to which they impart a green color and a pleasing sparkle.

The products of the invention, exclusive of the completely halogenated products (i.e., those of Formula 3 in which $u=11$ and those of Formula 4 in which $u=10$), are useful in the preparation of resistors from cellulosic materials. For example, a section of cotton string was soaked for a few minutes in a solution of $\{BH_2[As(CH_3)_3]_2\}[B_{12}H_{11}As(CH_3)_3]$ in $CH_2Cl_2$, and the solvent was allowed to evaporate from the impregnated string in air. A free flame was applied to the dried, impregnated string. The string burned to leave a self-supporting ash, which had the same size and shape as the original string and which could be handled without breaking. When supported on a paraffin block between two electrodes, the ash was found to have a resistance of about 30,000 ohms/in. The corresponding residue from the burning of an untreated string was very small and could not be handled.

Completely halogenated products of the invention, e.g., $B_{12}Cl_{10}[P(CH_3)_3]_2$ and $NaB_{12}Br_{11}As(C_2H_5)_3$, are useful as impregnating agents for retarding the combustion of cellulosic products such as paper and cotton cloth.

Products of Formulas 3 and 6 that are strong acids, i.e., in which M is $H_3O$ and $m$ is 1, are useful in industrial applications in which it is desired to avoid contamination from the anions of strong acids such as sulfuric acid, hydrochloric acid, hydrobromic acid, chloric acid, and phosphoric aicd. For example, these acidic products of the invention are useful for etching metals such as steel and for rust removal, pickling, scale removal, and similar metal-processing operations. Examples of such acidic products of this invention are $H_3OB_{12}H_{11}As(C_4H_9)_2CH_3$, $H_3OB_{12}H_6Cl_5P(CH_3)_2C_2H_5$, $H_3OB_{12}F_{11}As(C_2H_5)_3$, and $H_3OB_{12}H_{11}P(CH_3)_2C_5H_9$ ($C_5H_9$=cyclopentyl).

The above acids are also useful as catalysts in the preparation of organic esters from alcohols and carboxylic acids and of acetals from alcohols and aldehydes. In these uses they function in the same manner as known catalysts such as sulfuric acid and p-toluene-sulfonic acid.

Aqueous solutions of the acids are useful as agents for absorbing basic materials whose presence in the atmosphere is undesirable, e.g., traces of ammonia and lower alkylamines. For example, when air contaminated with methylamines is passed through an aqueous solution of any of the acidic products of the invention exemplified above, the amines are completely removed from the air.

The acids and many of the salts of Formulas 3 and 6, especially the alkali-metal and alkaline-earth-metal salts, are useful as sequestering agents for heavy metals. For example, if a mixture of hydrocarbons in the boiling range of gasoline that contains a copper salt of an organic acid (e.g., copper stearate), is thoroughly agitated with an aqueous ammonical solution of a salt such as $LiB_{12}H_{10}IP(CH_3)_2C_6H_{13}$ or
$Mg[B_{12}H_1As(CH_{13})_2CH(CH_3)C_2H_5]_2$ and the hydrocarbon layer is separated, the latter is completely free of deleterious copper salt.

Salts of Formula 1 are useful as sequestering agents and precipitants for large anions. For example, ions such as $HgCl_3^-$ and $Cr(SCN)_4(NH_3)_2^-$ can be removed completely from aqueous solutions by addition of excess $BH_2[P(C_3H_7)_2CH_3]_2F$ or $\{BH_2[As(CH_3)_3]_2\}_2SO_4$ The nonelectrolytic products of Formula 4, exclusive of completely halogenated products (i.e., exclusive of those in which $u=10$) are useful as halogen scavengers. For example, when air or nitrogen containing minor amounts of fluorine, chlorine, bromine, iodine, or a mixture thereof is passed through a solution of $B_{12}H_{10}[As(C_2H_5)_3]_2$, $B_{12}H_5Cl_5[P(CH_3)_3]$
$B_{12}H_{10}P(CH_3)_2C_6H_{11}$, or $B_{12}H_8ClBr[As(C_2H_5)_2CH_3]_2$ in a solvent such as dichlorobenzene, the halogen or halogens are completely removed from the air or nitrogen.

The completely halogenated nonelectrolytic products of Formula 4, i.e., those in which $u=10$, are useful as combustion retardants. For example, when $B_{12}Cl_{10}[P(CH_3)_3]_2$ in finely powdered form is sprinkled or forced under pressure onto a fire such as that produced by a burning liquid, the burning is stopped completely or greatly reduced in rate.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound selected from the class consisting of $[BH_2(ZRR'R'')_2]_aA$ and $M_n[B_{12}H_{10+n-u}X_u(ZRR'R'')_p]_m$ wherein A is an anion of atomic weight between 17 and 216;
$a$ is the valence of anion A;
M is a cation;
$m$ is the valence of cation M;
X is halogen;

17

$u$ is a cardinal number of from 0 to $10+n$, inclusive;
$n$ is a cardinal number of 0 to 1, inclusive, $p$ is a cardinal number of 1 to 2, inclusive, and the sum of $n$ and $p$ is 2;
R is saturated lower aliphatic hydrocarbon bonded to Z through a carbon bearing at least one hydrogen;
R' and R'' are saturated lower aliphatic hydrocarbon bonded to Z through a carbon bearing at least 2 hydrogens;
said R, R' and R'' groups containing together at most one carbon free of hydrogen, said R'' being methyl when the sum of the carbons in R and R' is greater than 4; and
Z is selected from the class consisting of phosphorus and arsenic.

2. A compound having the formula $$[BH_2(ZRR'R'')_2]_aA$$

wherein

A is an anion of atomic weight between 17 and 216,
$a$ is the valence of A,
R is saturated lower aliphatic hydrocarbon bonded to Z through a carbon bearing at least one hydrogen,
R' and R'' are saturated lower aliphatic hydrocarbon bonded to Z through a carbon bearing at least 2 hydrogens,
said R, R' and R'' groups containing together at most one carbon free of hydrogen, said R'' being methyl when the sum of the carbons in R and R' is greater than 4, and
Z is selected from the class consisting of phosphorus and arsenic.

3. A compound of claim 2 wherein A is $B_{12}H_{12}$ and $a$ is 2.
4. A compound of claim 2 in hydrated form.
5. A compound having the formula $$M_n[B_{12}H_{10+n-u}X_u(ZRR'R'')_p]_m$$

wherein

M is a cation,
$m$ is the valence of cation M,
X is halogen,
$u$ is a cardinal number of from 0 to $10+n$, inclusive,
$n$ is a cardinal number of 0 to 1, inclusive, $p$ is a cardinal number of 1 to 2, inclusive, and the sum of $n$ and $p$ is 2;
R is saturated lower aliphatic hydrocarbon bonded to Z through a carbon bearing at least one hydrogen,
R' and R'' are saturated lower aliphatic hydrocarbon bonded to Z through a carbon bearing at least 2 hydrogens,
said R, R', and R'' groups containing together at most one carbon free of hydrogen, said R'' being methyl when the sum of the carbons in R and R' is greater than 4, and
Z is selected from the class consisting of phosphorus and arsenic.

6. A compound of claim 5 in hydrated form.
7. A compound of claim 5 wherein $n$ is 1 and $p$ is 1.
8. A compound of claim 5 wherein $n$ is 0 and $p$ is 2.
9. A compound of claim 5 wherein $u$ is 0, $n$ is 1 and $p$ is 1.
10. A compound of claim 5 wherein $u$ is 0, $n$ is 0, and $p$ is 2.
11. A compound of claim 5 wherein $n$ is 1, $u$ is 0, $p$ is 1, $m$ is 1 and M is $BH_2(ZRR'R'')_2^+$.
12. $(BH_2[(CH_3)_3]_2)_2B_{12}H_{12}$.
13. $BH_2[P(CH_3)_3]_2Cl$.
14. The compound of claim 13 in hydrated form.
15. $BH_2[As(CH_3)_3]_2Cl$.
16. The compound of claim 15 in hydrated form.
17. $H_3O[B_{12}H_{11}P(CH_3)_3]$.
18. The compound of claim 17 in hydrated form.
19. $H_3O[B_{12}H_{11}As(CH_3)_3]$.

18

20. The compound of claim 19 in hydrated form.
21. A process for preparing a compound selected from the class consisting of $$[BH_2(ZRR'R'')_2]_2B_{12}H_{12}, \; B_{12}H_{10}(ZRR'R'')_2$$

and $$[BH_2(ZRR'R'')_2][B_{12}H_{11}ZRR'R'']$$

wherein

R is saturated lower aliphatic hydrocarbon bonded to Z through a carbon bearing at least one hydrogen,
R' and R'' are saturated lower aliphatic hydrocarbon bonded to Z through a carbon bearing at least 2 hydrogens,
said R, R', and R'' groups containing together at most one carbon free of hydrogen, and said R'' being methyl when the sum of the carbons in R and R' is greater than 4, and
Z is selected from the class consisting of phosphorous and arsenic, which comprises treating $BH_3ZRR'R''$ wherein Z, R, R' and R'' are defined as above with a boron hydride of the formula $B_yH_{y+4}$ wherein $y$ is selected from the class consisting of 2, 5, and 10 at a temperature of at least 75° C. and separating the respective products.

22. A process for preparing $$[BH_2(ZRR'R'')_2]A$$

wherein

A is an anion selected from the class consisting of hydroxide and chloride,
Z is selected from the class consisting of phosphorus and arsenic,
R is saturated lower aliphatic hydrocarbon bonded to Z through a carbon bearing at least on hydrogen,
R' and R'' are saturated lower aliphatic hydrocarbon bonded to Z through a carbon bearing at least 2 hydrogens,
said R, R', and R'' groups containing together at most one carbon free of hydrogen, and said R'' being methyl when the sum of the carbons in R and R' is greater than 4, which comprises treating a compound selected from the class consisting of $[BH_2(ZRR'R'')_2]_2B_{12}H_{12}$ and $$[BH_2(ZRR'R'')_2][B_{12}H_{11}(ZRR'R'')]$$

wherein Z, R, R' and R'' are defined as above, with an anion-exchange resin containing said anion A.

23. A process for preparing a compound of the formula $$[BH_2(ZRR'R'')_2]_aA$$

A is an anion derived from a protonic acid and has an atomic weight between 17 and 216,
$a$ is the valence of A,
Z is selected from the class consisting of phosphorus and arsenic,
R is saturated lower aliphatic hydrocarbon bonded to Z through a carbon bearing at least one hydrogen,
R' and R'' are saturated lower aliphatic hydrocarbon bonded to Z through a carbon bearing at least 2 hydrogens,
said R, R', and R'' groups containing together at most one carbon free of hydrogen, and said R'' being methyl when the sum of the carbons in R and R' is greater than 4, which comprises treating $BH_2(ZRR'R'')_2OH$ wherein Z, R, R' and R'' are defined as above with a protonic acid containing the anion A.

24. A process for preparing a compound of the formula $$H[B_{12}H_{11}(ZRR'R'')]$$

wherein

Z is selected from the class consisting of phosphorus and arsenic,

R is saturated lower aliphatic hydrocarbon bonded to Z through a carbon bearing at least one hydrogen, R′ and R″ are saturated lower aliphatic hydrocarbon bonded to Z through a carbon bearing at least 2 hydrogens, said R, R′ and R″ groups containing at most one carbon free of hydrogen, and said R″ being methyl when the sum of the carbons in R and R′ is greater than 4, which comprises treating $$[BH_2(ZRR'R'')_2][B_{12}H_{11}ZRR'R'']$$

wherein Z, R, R′ and R″ are defined as above with an acidic cation-exchange resin.

25. A process for preparing a compound of the formula $$M_n[B_{12}H_{10+n-u}X_u(ZRR'R'')_p]_m$$

wherein

M is a cation selected from the class consisting of hydronium and alkali metal, $m$ is the valence of M, X is halogen, $u$ is a cardinal number of from 0 to $10+n$, inclusive, $n$ is a cardinal number of 0 to 1, inclusive, $p$ is a cardinal number of 1 to 2, inclusive, and the sum of $n$ and $p$ is 2, R is a saturated lower aliphatic hydrocarbon bonded to Z through a carbon bearing at least one hydrogen, R′ and R″ are saturated lower aliphatic hydrocarbon bonded to Z through a carbon bearing at least 2 hydrogens, said R, R′, and R″ groups containing together at most one carbon bearing no hydrogen, said R″ being methyl when the sum of the carbons in R and R′ is greater than 4, and Z is selected from the class consisting of phosphorus and arsenic, which comprises treating $M_n[B_{12}H_{10+n}(ZRR'R'')_p]_m$ wherein M, $n$, $p$, $m$, Z, R, R′ and R″ are defined as above with a halogen in a polar solvent.

26. A process for preparing $[BH_2(ZRR'R'')_2]_aA$ which comprises treating $BH_2(ZRR'R'')_2Cl$ with a compound MA, in an aqueous solution, Z being selected from the class consisting of phosphorus and arsenic, R being saturated lower aliphatic hydrocarbon bonded to Z through a carbon bearing at least one hydrogen, R′ and R″ being saturated lower aliphatic hydrocarbon bonded to Z through a carbon bearing at least 2 hydrogens, said R, R′ and R″ groups containing at most one carbon free of hydrogen, and said R″ being methyl when the sum of the carbons in R and R′ is greater than 4, A being an anion with an atomic weight between 17 and 216 which, with the $BH_2(ZRR'R'')_2$ cation, forms a compound $[BH_2(ZRR'R'')_2]_aA$ that is less soluble in water than the reactants $BH_2(ZRR'R'')_2Cl$ and MA, $a$ is the valence of A, and M is a cation which, with the Cl anion forms a compound MCl that is soluble in water.

27. A process for preparing a compound of the formula $$M[B_{12}H_{11}(ZRR'R'')]_m$$

wherein

M is a cation, $m$ is the valence of M,

Z is selected from the class consisting of phosphorus and arsenic,

R is saturated lower aliphatic hydrocarbon bonded to Z through a carbon bearing at least one hydrogen, R′ and R″ are saturated lower aliphatic hydrocarbon bonded to Z through a carbon bearing at least 2 hydrogens, said R, R′ and R″ groups containing at most one carbon free of hydrogen, and said R″ being methyl when the sum of the carbons in R and R′ is greater than 4, which comprises treating $H[B_{12}H_{11}(ZRR'R'')]$ wherein Z, R, R′, and R″ are defined as above, with a base containing the cation M.

References Cited by the Examiner

UNITED STATES PATENTS 3,050,361    8/62    Muetterties _____ 260—440

OTHER REFERENCES

Akad. Nauk USSR, Izvestia, pages 2078 to 2079, November 1961.

Graybill et al.: J.A.C.S., vol. 84, 1062 to 1063, Mar. 20, 1962.

TOBIAS E. LEVOW, *Primary Examiner.*

UNITED STATES PATENT OFFICE
CERTIFICATE OF CORRECTION

Patent No. 3,217,023                         November 9, 1965

Norman E. Miller

It is hereby certified that error appears in the above numbered patent requiring correction and that the said Letters Patent should read as corrected below.

Column 4, line 3, for "$NH_4FE_6$" read -- $NH_4PF_6$ --; column 6, line 32, the formula should appear as shown below instead of as in the patent:

$$H_3O^+B_{12}H_{11}P(CH_3)_3{}^-$$

same column 6, in the table, first column, line 18 thereof, for "Diemthylamine" read -- Dimethylamine --; column 9, line 29, for "$BH_2[Ac(CH_3)_3]_2PF_6$" read -- $BH_2[As(CH_3)_3]_2PF_6$ --; column 10, line 39, for "proprionate" read -- propionate --; column 11, lines 26 and 27, for "N-methylpiperidium, pyridinum" read -- N-methylpiperidinium, pyridinium --; columns 13 and 14, TABLE I, column 1, line 8 thereof, for "$BH_3P(CH_3(_2CH(CH_3)_2$" read -- $BH_3P(CH_3)_2CH(CH_3)_2$ --; column 17, claim 12, the formula should appear as shown below instead of as in the patent:

$$(BH_2[P(CH_3)_3]_2)_2B_{12}H_{12}$$

column 18, line 35, for "on" read -- one --; same column 18, line 50, after the formula, insert -- wherein --; column 19, line 26, strike out "a"; line 42, for "comprising" read -- comprises --.

Signed and sealed this 11th day of October 1966.

(SEAL)
Attest:

ERNEST W. SWIDER                            EDWARD J. BRENNER
Attesting Officer                          Commissioner of Patents